2,909,573
METHOD FOR THE PREPARATION OF ORTHOVINYLTOLUENE

Frederick J. Soderquist, Essexville, and James L. Amos, Midland, Mich., assignors to The Dow Chemical Company, Midland, Mich., a corporation of Delaware No Drawing. Application September 30, 1957
Serial No. 687,298

1 Claim. (Cl. 260—669)

This invention comprises a pyrolytic method for preparing ortho-vinyltoluene by dehydrogenating orthoethyltoluene whereby indene formation is substantially avoided.

It is well known in the art that indene is produced in substantial amounts when ortho-ethyltoluene is dehydrogenated at elevated temperatures in the presence of conventional dehydrogenation catalysts. Such substantial amounts of indene appear in the so-obtained ortho-vinyltoluene that, when the ortho-vinyltoluene is polymerized, the indene acts as a plasticizer and reduces the molecular weight of the desired polymeric vinyl products. Accordingly, the art has taught that indene formation is to be avoided as a pre-requisite to the production of vinyltoluene polymers having high heat distortion temperatures during the conventional dehydrogenation of ethyltoluenes. The art teaches that such indene formation is avoided by using meta- or paraethyltoluenes rather than ortho-ethyltoluene.

It has now been discovered, in accordance with this invention, that ortho-ethyltoluene can be dehydrogenated to give ortho-vinyltoluene, which is substantially free of indene, i.e., which has an indene to ortho-vinyltoluene ratio of no more than about 0.05. Such products are desirable for making polymeric molding compositions. The process of this invention comprises pyrolyzing orthoethyltoluene, in admixture with steam at a temperature between about 450° and 750° C. in contact with a calcium-nickel-phosphate catalyst at a space velocity between one and ten grams of hydrocarbon per ml. of catalyst per hour. The calcium-nickel-phosphate catalysts used in this process are unique in promoting the formation of ortho-vinyltoluene while suppressing the formation of indene. The method of catalyst preparation is disclosed in Ind. Eng. Chem. 43, 2871, December 1951.

Other inert diluent gases can be used in conjunction with steam. They include carbon dioxide, relatively unreactive hydrocarbons such as methane, vaporized benzene, and the like. The proportion by weight of total diluent to feed stock can be varied so long as between 0.5 and 5 parts by weight of steam per part of hydrocarbon feedstock is present.

It is not necessary that the feedstock be pure ortho-ethyltoluene. On the contrary, commercial mixtures, e.g., of o-, m-, and p-ethyltoluenes, containing a preponderant amount of o-ethyltoluene, are advantageously used to give mixed vinyltoluenes by the process of this invention.

The reaction can be carried out at atmospheric, substantially atmospheric or sub-atmospheric pressures.

In practice, an ortho-ethyltoluene feedstock together with the steam diluent is passed into contact with a calcium-nickel-phosphate catalyst in a reaction zone maintained at a temperature between about 450° and 750° C. and at a space velocity between one and ten grams of hydrocarbon per ml. of catalyst per hour. Effluent from the reaction zone is cooled to condense liquid product. Water is separated, and the liquid product is then fractionated to separate and recover the desired product, ortho-vinyltoluene.

The following examples show ways in which the invention has been practiced. Parts and percentages are by weight unless otherwise indicated.

Example 1

A quantity of 984 grams of o-ethyltoluene was vaporized and passed over 70 ml. of a calcium-nickel-phosphate catalyst, prepared and pre-roasted as described in the previous literature citation, together with 6904 grams of steam diluent at rates of 22 and 62.8 grams per hour, respectively. Catalyst temperature was maintained at approximately 665° C. by means of external electric resistance windings. Operation was cyclic according to the following schedule: Hydrocarbon on stream, 60 minutes; steam for purge only, 15 minutes; air and steam for catalyst reactivation, 60 minutes; steam for purge only, 5 to 10 minutes. Products and diluent were conducted to a glass condensing and separating system. The hydrocarbon liquid product was recovered, while the steam condensate and non-condensable gases were measured and discarded. A quantity of 793 grams of hydrocarbon product was recovered. This was fractionally distilled and the fractions were analyzed by infra-red spectrometry. The liquid hydrocarbon product was found to contain the following:

|  | Percent by weight |
|---|---|
| Benzene | 0.1 |
| Toluene | 1.0 |
| o-Xylene | 0.9 |
| Styrene | 0.2 |
| o-Ethyltoluene | 74.7 |
| o-Vinyltoluene | 22.0 |
| Indene | 0.6 |
| Undetermined | 0.5 |

The ratio of indene to ortho-vinyltoluene was 0.027. Unconverted o-ethyltoluene can be recycled.

In contrast thereto, a similar operation was conducted employing 70 ml. of activated bauxite catalyst, a hydrocarbon feed of 1826 grams at 22.5 grams per hour and a steam feed of 564 grams at 69.7 grams per hour. The operating temperature was 620° to 630° C. Liquid hydrocarbon product recovered amounted to 1454 grams. It had the following analysis:

|  | Percent by weight |
|---|---|
| Benzene | 0.1 |
| Toluene | 2.1 |
| o-Xylene | 1.4 |
| Styrene | 0.2 |
| o-Ethyltoluene | 68.6 |
| o-Vinyltoluene | 21.1 |
| Indene | 2.8 |
| Naphthalene | 0.1 |
| Undetermined | 3.6 |

The ratio of indene to ortho-vinyltoluene was 0.133, 493 percent of the ratio of Example 1.

Further comparative operations were carried out with another activated bauxite catalyst and with a self regenerating ferric oxide catalyst described by Kearby in which the mode of operation was changed to long on-stream cycles to take full advantage of the catalyst's characteristics under the following operating conditions:

|  | Activated bauxite | Kearby ferric oxide catalyst |
|---|---|---|
| Cycle _____ hours __ | 24 | 92 |
| Temperature _____ °C __ | 630–700 | 700 |
| Hydrocarbon feed _____ grams __ | 1,495 | 1,959 |
| Hydrocarbon rate _____ grams per hour __ | 20.8 | 21.3 |
| Steam feed _____ grams __ | 4,527 | 4,458 |
| Steam rate _____ grams per hour __ | 62.9 | 48.5 |

Fractionation of the liquid hydrocarbon products recovered from each of the above processes analyzed as follows:

|  | Activated bauxite process, percent by weight | Kearby catalyst process, percent by weight |
|---|---|---|
| Benzene | 0.2 | 0.4 |
| Toluene | 4.2 | 3.4 |
| o-Xylene | 7.5 | 4.0 |
| Styrene | 1.5 | 1.4 |
| o-Ethyltoluene | 53.5 | 64.3 |
| o-Vinyltoluene | 22.9 | 13.6 |
| Indene | 5.9 | 9.7 |
| Naphthalene | 0.1 |  |
| Isopropenyltoluene | 2.4 |  |
| Undetermined | 1.8 | 3.2 |
| Ratio: indene to o-vinyltoluene | [1] 0.28 | [2] 0.71 |

[1] 1,040 percent of Example 1.
[2] 2,630 percent of Example 1.

*Example 2*

The procedure of Example 1 was modified in that a reaction temperature of 525° C. was used with an o-ethyltoluene vapor feed rate of 138.3 grams per hour (composition 94 percent o-, 0.5 percent m- and 3.5 percent p-ethyltoluene and 2.0 percent xylenes) and a steam feed rate of 391 grams per hour. Space velocity was 0.461 gram feed per ml. of catalyst per hour. Reaction conditions otherwise were similar to those of Eaxmple 1. The 980 grams of hydrocarbon product recovered was fractionated to give 196.7 grams of o-vinyltoluene and 10.5 grams of indene.

*Example 3*

The procedure of Example 1 was modified in that an o-ethyltoluene vapor feed rate of 173.2 grams per hour (composition 88 percent o-, 3 percent m-, 7 percent p-ethyltoluene and 2 percent xylenes) and a steam feed rate of 480 grams per hours was used. Space velocity was 0.578 gram feed per ml. of catalyst per hour. The reaction temperature was 525° C. Otherwise reaction conditions were similar to those of Example 1. A 980 gram portion of the hydrocarbon product recovered was fractionated to give 227.6 grams of o-vinyltoluene product and 9.98 grams of indene.

What is claimed is:

A method for making ortho-vinyltoluene, which method comprises passing an ortho-ethyltoluene feedstock in admixture with a steam diluent into contact with a calcium-nickel-phosphate dehydrogenation catalyst at a reaction temperature between 450° and 750° C. and at a space velocity between 0.314 and 10 grams of feedstock per milliliter of catalyst per hour, the proportion of steam to feedstock ranging between 0.5 and 5 parts by weight of steam per part of feedstock, and recovering ortho-vinyltoluene product.

References Cited in the file of this patent

UNITED STATES PATENTS

| 1,541,175 | Ostromislensky et al. | June 9, 1925 |
| 2,184,235 | Groll et al. | Dec. 19, 1939 |
| 2,456,368 | Britton et al. | Dec. 14, 1948 |
| 2,531,327 | Elwell | Nov. 21, 1950 |